(12) United States Patent
Damen et al.

(10) Patent No.: US 6,356,856 B1
(45) Date of Patent: Mar. 12, 2002

(54) METHOD OF AND SYSTEM FOR MEASURING PERFORMANCE DURING AN EXERCISE ACTIVITY, AND AN ATHLETIC SHOE FOR USE IN SYSTEM

(75) Inventors: Erik P. N. Damen; Christoph Schiller, both of Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/255,630

(22) Filed: Feb. 22, 1999

(30) Foreign Application Priority Data

Feb. 25, 1998 (EP) .............................................. 98200594

(51) Int. Cl.⁷ ............................. G01B 5/02; G01B 5/14; G01B 7/02
(52) U.S. Cl. ............................... 702/160; 482/8; 482/9; 482/3
(58) Field of Search ........................... 702/160, 57, 108, 702/124, 139, 142, 149, 66, 67, 68, 164, 165, 178, 182, 183, 187; 235/105; 377/24.2; 482/8, 9, 3; 73/490, 503, 573.1, 493

(56) References Cited

U.S. PATENT DOCUMENTS

| | | | |
|---|---|---|---|
| 4,578,769 A | | 3/1986 | Frederick .................... 364/565 |
| 4,703,445 A | * | 10/1987 | Dassler ....................... 702/160 |
| 4,962,469 A | * | 10/1990 | Ono et al. .................. 702/160 |
| 5,033,013 A | * | 7/1991 | Kato et al. ................ 7025/160 |
| 5,471,405 A | * | 11/1995 | Marsh .......................... 702/41 |
| 5,574,669 A | * | 11/1996 | Marshall ..................... 702/149 |
| 5,724,265 A | * | 3/1998 | Hutchings .................. 702/141 |
| 5,955,667 A | * | 9/1999 | Fyfe ............................ 73/490 |

FOREIGN PATENT DOCUMENTS

WO          97/21983          6/1997          ........... G01C/22/00

* cited by examiner

Primary Examiner—Patrick Assouad
Assistant Examiner—Demetrius Pretzow
(74) Attorney, Agent, or Firm—Ernestine C. Bartlett; Norman N. Spain (57) ABSTRACT

A system for measuring the speed of a person while running or walking along a surface. A single acceleration sensor measures the acceleration in the forward direction and provides an acceleration signal which is amplified and subsequently sampled by analog to digital converter. The digital signal is processed by a microprocessor which executes an algorithm that determines the stride length and the stride duration from the digitized acceleration signal and calculates the speed and the distance traversed. The information thus obtained is transmitted by means of a radio frequency transmitter and received by a radio frequency receiver in a watch or other device which comprises a display which can be viewed by the runner or walker. The speed and distance traversed is displayed on the display, along with other useful information, such as average speed, maximum speed, total distance traversed, calories expended, and heart beat.

20 Claims, 5 Drawing Sheets

METHOD OF AND SYSTEM FOR MEASURING PERFORMANCE DURING AN EXERCISE ACTIVITY, AND AN ATHLETIC SHOE FOR USE IN SYSTEM

BACKGROUND OF THE INVENTION

The invention relates to a method of and a system for determining the speed, distance traversed, elapsed time, average speed, calories expended by a person or animal while running or walking. The invention further relates to an athletic or hiking shoe for use in the system or method.

In the past years it has been clearly shown that regular exercise is an important factor against cardiovascular illnesses. Further it has been shown that regular exercise has a positive effect on the mental condition of a person. Many individuals therefore turned to their own fitness program of regular jogging, running or walking. Running has been recognized for its therapeutic effects on the body. It increases cardiopulmonary fitness, helps lower the blood pressure, decreases cholesterol associated with heart disease and reduces weight. Because of the growing popularity of walking, jogging and running, the number of devices aiding those people who walk, jog or run, is growing as well. Devices already common to the market place are those which are generally called step counters or pedometers. If the stride length of a runner or walker is constant, the step counter gives a measure of the speed of the runner or walker and the distance traversed. However, the stride length is in general not constant and certainly not for various speeds, and thus, these devices are not very accurate.

There are devices known in the prior art which measure the speed of the runner without input of the stride length. One of these methods is described in U.S. Pat. No. 4,578,769, which calculates the running or walking speed by measuring the contact time between the shoe and the ground. However, the relationship between contact time and speed is only linear for running speeds above 8 km/h. An accurate determination of the walking speed and the distance traversed while walking is not possible with this device. Moreover said relationship and said determination is dependent on the person.

A more accurate device is known from International Application No. WO 97/21983. In this known device accelerometers and rotational sensors and an electronic circuit that performs mathematical calculations to determine the distance and height of each step are placed in the sole of one shoe of the runner. This known device employs three acceleration and three rotational sensors for measuring the displacement of the runner's foot. it will be appreciated that this known device is complicated and relatively expensive.

SUMMARY OF THE INVENTION

It is an object of the invention to provide a new and improved measuring method and system for a running aid which overcomes disadvantages of the prior art devices and which is relatively inexpensive and simple and convenient to use.

A further object of the invention is to provide a running aid with which the speed of the runner can be easily and accurately determined.

A still further object of the invention is to provide a running aid with which the distance traversed by the runner can be easily and accurately determined.

Another object of the invention is to provide a running aid with which the average and maximum speed, total distance traversed by the runner, stride length of the runner, elapsed time, number of calories expended by the runner can be easily and accurately determined.

To obtain the above and other objects, according to the present invention, there is provided a system for measuring performance during an exercise activity comprising: an acceleration sensor for measuring acceleration in a moving direction of a foot of an exerciser and for providing an acceleration signal in response to said acceleration; signal processing means comprising: means for analyzing a waveform of the acceleration signal and for determining from the analyzing a beginning and an end of movement of the foot during a stride made by the foot of the exerciser; means for single integrating and for double integrating the acceleration signal between said beginning and said end of movement in order to compute the speed of the foot as a function of time during the stride and the distance traversed by the foot as a function of time during the stride, respectively; means for computing an acceleration error by equalizing the acceleration error with the speed at the end of the movement of the foot divided by the time lapsed between the end and the beginning of the stride; means for computing a distance error by double integrating the acceleration error over said time lapsed between the end and the beginning of the movement of the foot; means for computing a corrected distance by subtracting the distance error from the distance traversed during the stride.

The method used in the invention to determine the speed and the distance traversed while running or walking is based on a constant monitoring of the acceleration of a foot of the runner or walker. This is done by minimally one accelerometer attached to the foot or shoe or mounted in a shoe of the runner which measures the acceleration in the forward direction, parallel to the line between the toes and heel of the foot or between the nose and the heel of the shoe if the forward speed and stride length of the runner is to be monitored; or in a direction perpendicular to that direction if the vertical speed and jump height of the runner is to be measured; or in any direction in which one is interested to measure the performance during an exercise. The signal generated by the accelerometer is processed and analyzed.

The algorithm used to interpret the acceleration signal consists basically of three main functions, i.e. the determination of the beginning and end of a stride, the double integration of the acceleration signal, and the correction of the double integrated signal. The determination of the beginning and end of the stride is done by analyzing the waveform of the acceleration signal. Single integration of the acceleration signal between the beginning and end results in the speed of the foot as a function of time, while the double integration of the acceleration signal gives the distance of the foot as a function of time.

However, the acceleration sensed by the acceleration sensor is not the same as the true acceleration of the foot or shoe in the walking or running direction. Because of the constantly changing angle between the foot or shoe and the ground, there is a complicated relationship between the acceleration in the walking or running direction and the acceleration sensed by he acceleration sensor. Further, because of this changing angle, also the gravitational acceleration results in an extra complicating signal. However, the inventors have realized that one does not need to know the angle as a function of time when a further condition is used.

At the end of the stride the velocity of the foot or shoe is zero, because it has landed on the ground. The result of the single integration of the acceleration signal from the beginning of a stride to the end of a stride, i.e. the velocity of the foot or shoe at the end of the stride, however, is not equal to zero due to the extra component in the acceleration signal. This extra component is calculated from the speed at the end of the stride and used to compute a corrected distance traversed during the stride. The speed of the runner is calculated by dividing the corrected distance by the time lapsed between successive strides. In this way the distance traversed and the speed of the runner can be measured accurately without making use of a plurality of acceleration and rotational sensors.

By inputting personal data, such as the mass of the exerciser, it is possible to compute the number of calories expended by the exerciser. By adding a heart rate monitor and combining heart rate data and the calories expended by the exerciser per unit of time a number can be generated which is representative of the fitness or condition of the exerciser. The running aid system may further comprise a display unit worn around the wrist or somewhere else which displays data such as current speed, stride length, elapsed time, average speed, maximum speed, total distance traversed, calories expended and fitness indication. The communication between the unit comprising the acceleration sensor and the signal processing means and the display unit is preferable done by means of a wireless transmitter in the sensor unit and a receiver in the display unit.

The acceleration sensor may be incorporated in a unit to be attached to the foot of the exerciser. This unit can also be incorporated in the sole of an athletic shoe. This unit may further comprise the signal processing means and the transmitter.

BRIEF DESCRIPTION OF THE DRAWINGS

The above and other features and advantages of the invention will be apparent from the following description of exemplary embodiments of the invention with reference to the accompanying drawings, in which.

Like reference symbols are employed in the drawings and in the description of the preferred embodiments to represent the same or very similar item or items.

DESCRIPTION OF THE PREFERRED EMBODIMENTS

Figure 1:
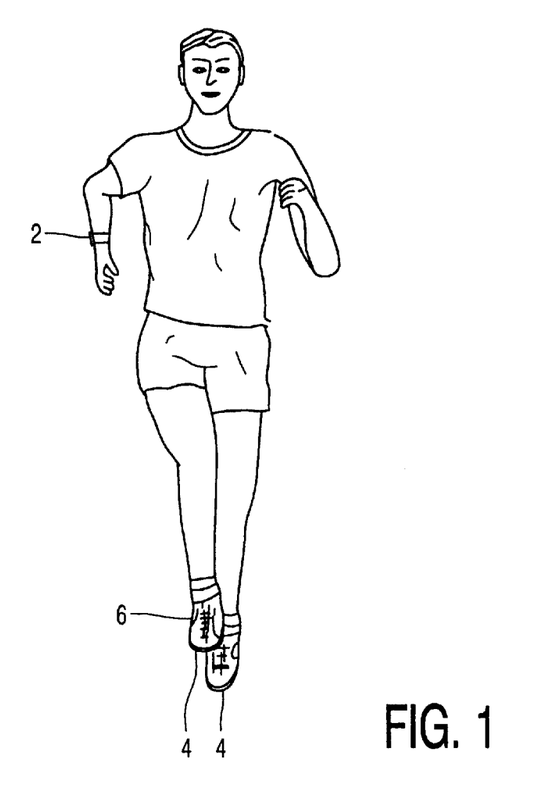
FIG. 1 is a perspective view of a runner showing the sensor unit attached to the foot and a receiving and displaying unit worn on the wrist.

FIG. 1 shows a walking or running person wearing a display unit 2 around his wrist and wearing athletic shoes 4.

Figure 2:
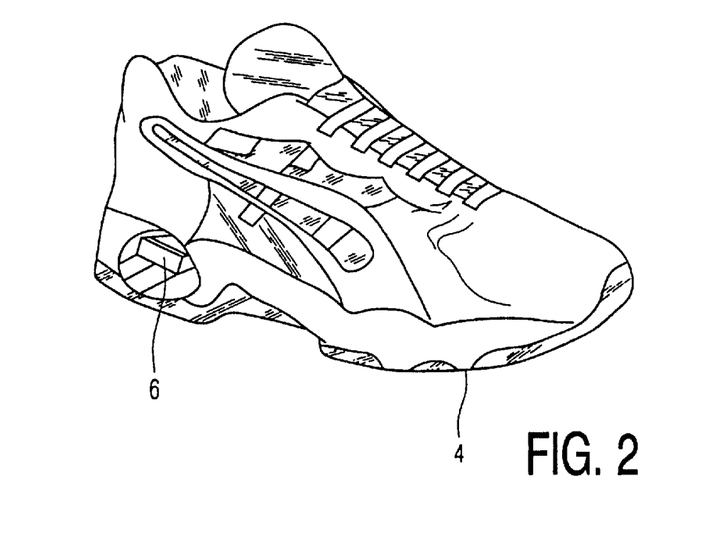
FIG. 2 is a partial-sectional view of an athletic shoe with a built-in acceleration sensor operating according to the principles of the invention.
Figure 3:
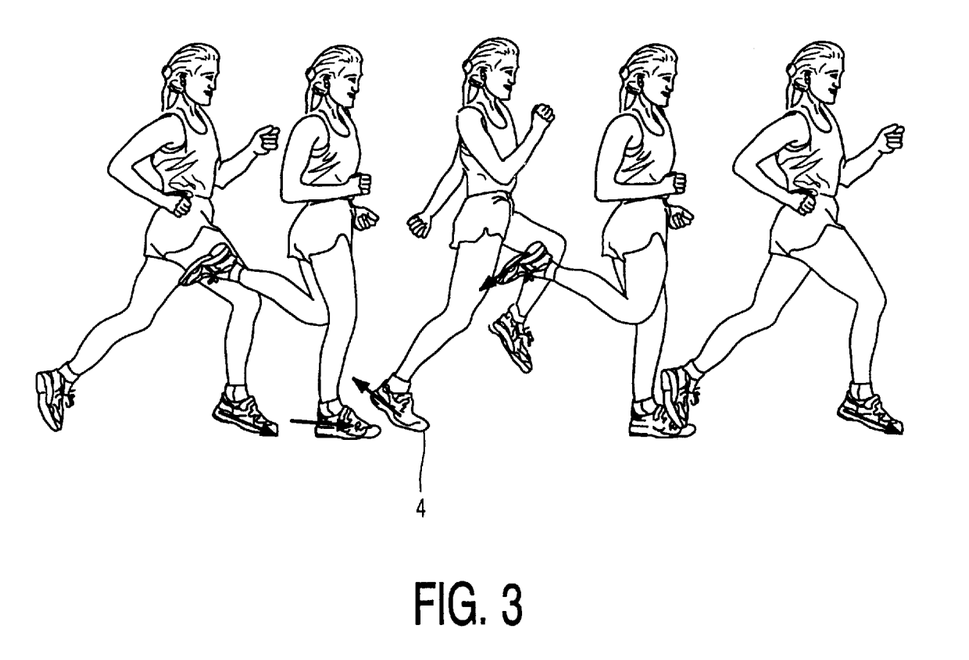
FIG. 3 shows the acceleration of a foot of a runner in a direction parallel to a line between the nose and heel of an athletic shoe worn by the runner.
Figure 4:
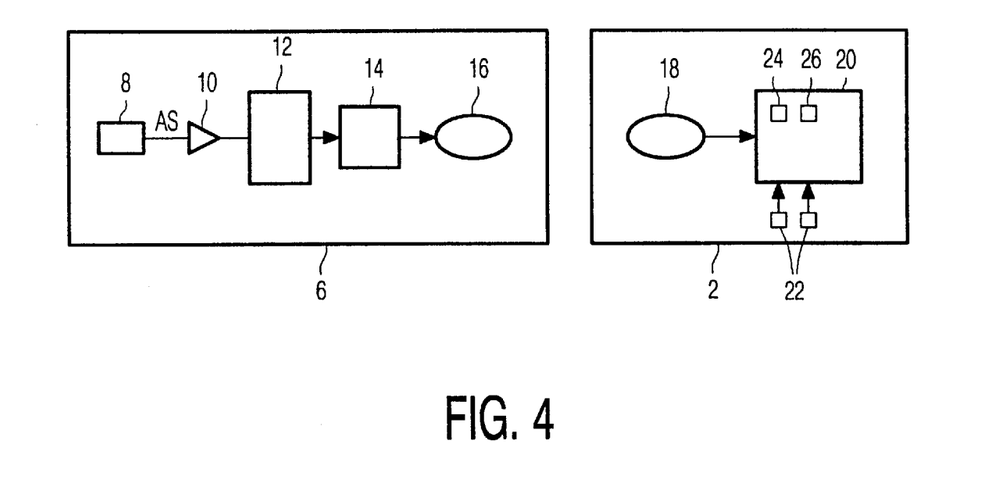
FIG. 4 shows a block diagram of the electronic units making up the running aid system.

To one of the shoes 4 a sensor unit 6 is attached. However, the sensor unit 6 may also be incorporated in the sole of the shoe as shown in more detail in FIG. 2. The sensor unit 6 may also be attached directly to the foot of the person. FIG. 4 shows a block diagram of the electronics in the display unit 2 and the sensor unit 6. The sensor unit 6 comprises an acceleration sensor 8 mounted in such a way that it senses acceleration in a direction substantially parallel to a line between the nose and the heel of the shoe 4, or between the toes and the heel of the foot of the person in case the person wares the sensor unit 6 directly attached to the foot. FIG. 3 shows a running person wearing the shoe 4 with built-in sensor unit 6. The arrows indicate the direction of acceleration of the shoe 4 along the line between the nose and heel of the shoe 4. The acceleration sensor 8 should be mounted to be sensitive in the direction indicated with the arrows in FIG. 3. An acceleration sensor suitable for this purpose is for example the piezo-electric accelerometer type PKGS-00LA-TC manufactured by Murata. The sensor unit 6 further comprises an amplifier 10 which amplifies the acceleration signal AS from the acceleration sensor 8 to a level suitable to an analog-to-digital converter (ADC) 12 which converts the amplified analog acceleration signal to a digital signal. The digital signal is supplied to a microprocessor 14 which performs the analysis of the waveform of the acceleration sensor signal, the computation of the speed, stride length and other parameters of the running person, and the generation of signals for driving a transmitter 16. The display unit 2 comprises a receiver 18 and a display 20.

The electronic components necessary to perform the above electronic functions of the sensor unit 6 may be mounted on a small printed circuit board and fitted inside the shoe sole or put in a small casing attached to one of the sides or on top of the shoe 4.

The runner or walker has to be able to read the current running or walking speed, distance traversed, average speed, elapsed time, etc. For this purpose, a display is needed in a wrist watch, in a small hand held device or made available to the user in any other way. The communication between the sensor unit 6 in or attached to the shoe 4 and the display unit 2 around the wrist or somewhere else, is wireless. The data transmission may be very much like the data transmission between the sensor and the display unit of a cyclocomputer. A cyclocomputer receives a repetitious pulsed signal from a sensor close to the revolving bicycle wheel and calculates the cycling speed on the basis of this signal and the wheel circumference. The same principle can be used in the present invention. The microprocessor 14 in the sensor unit 6 positioned in or attached to the shoe 4 converts the speed in meters per second to a number of pulses per second, equivalent to a certain number of virtual wheel circumferences per second. A small RF oscillator circuit sends the pulses to the display unit 2 which mainly contains similar electronics as a standard cyclocomputer. Another possibility is to transmit information bytes with information of the speed and other measured data.

On the display 20 the speed, average speed, maximum speed, trip distance, total distance, trip time, clock time and expended calories are monitored. For calculating the expended calories, the mass of the user is needed, which has to be put in the computer in the display unit 2 in a convenient manner, for example with buttons 22 on the display unit 2. To avoid interference with another runner of walker with the same measuring device, the radio transmission must be encoded.

The acceleration signal AS of the acceleration sensor 8 represents the acceleration of the shoe 4 in the forward direction, i.e. in the direction of the toes of the runner. Although this acceleration signal is of the repeating kind, as every stride is similar to the previous stride, the output signal varies greatly depending on running or walking speed and style. However, one important aspect is common for all strides and is reflected in the waveform of the acceleration signals: the foot stands still at the beginning of a stride and stands still again at the end of a stride. This seems evident but is very important in the interpretation and analysis of the acceleration signals.

Figure 5:
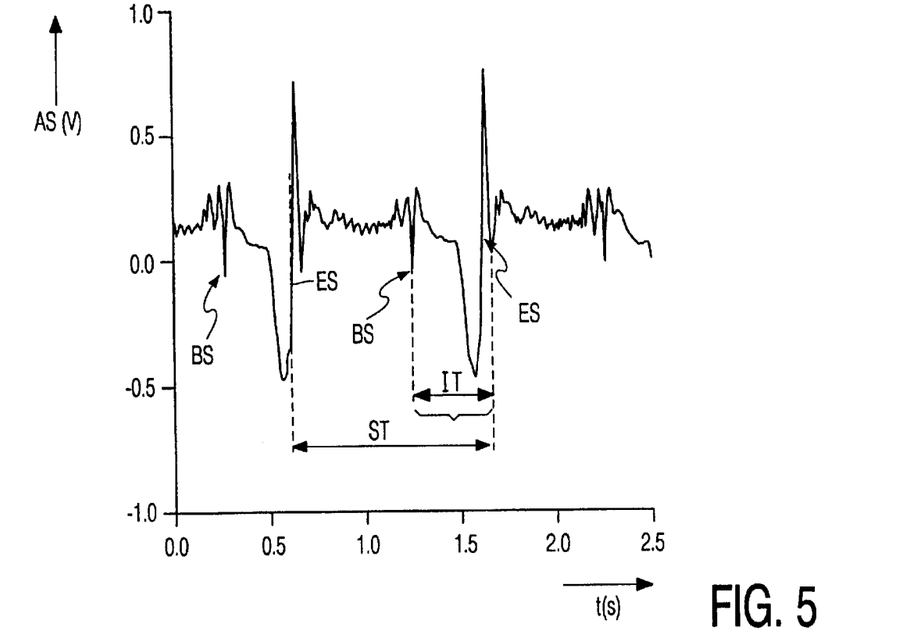
FIG. 5 shows an example of the waveform of the acceleration sensor signal while the runner is walking at 6 km/h.
Figure 6:
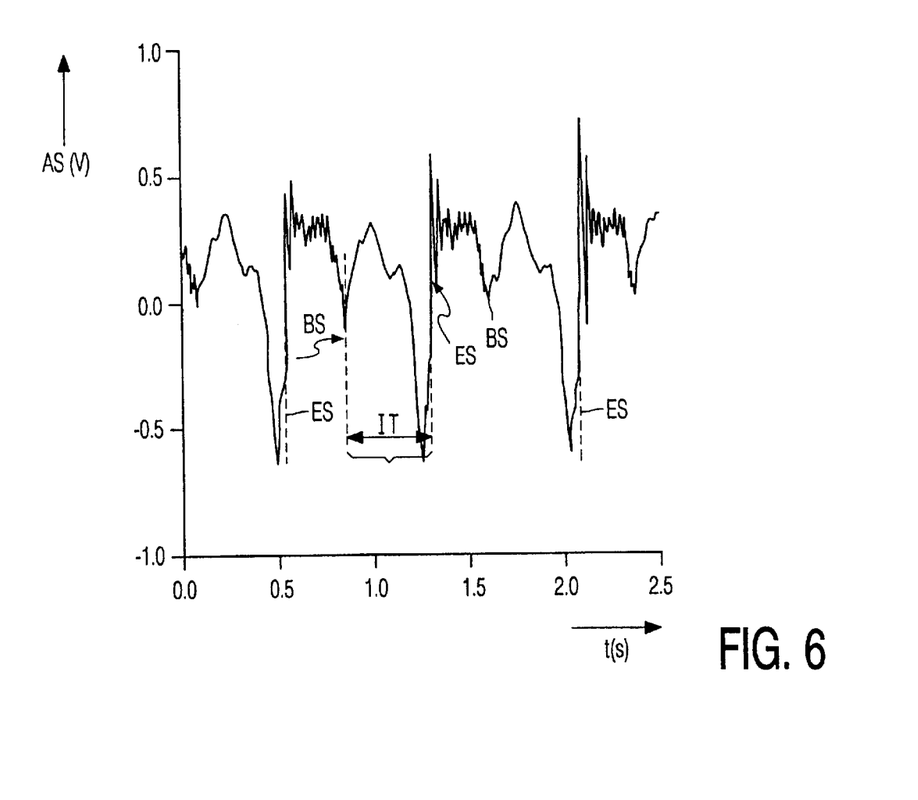
FIG. 6 shows an example of the waveform of the acceleration sensor signal while the runner is running at 9 km/h.

FIG. 5 shows an example of the amplified acceleration signal AS during 2,5 seconds of a person walking at 6 km/h. The relatively small negative peak BS indicates the beginning of a stride which corresponds to the moment the shoe leaves the ground and starts moving. The zero crossing ES after the large negative peak indicates the end of the stride which corresponds to the moment the shoe lands on the ground again and stops moving. The time between two zero crossings is the stride time ST. FIG. 6 shows the acceleration signal AS for a person running at 9 km/h. Also in this signal the relatively small negative peaks mark the beginning of a stride and the zero crossings the end of a stride.

The acceleration signal AS is subjected to an algorithm executed by the microprocessor 14. The first main function of the algorithm is the finding of the beginning and end of a stride. This is done by analyzing the waveform of the acceleration signal AS and finding the relatively small negative peaks BS in the signal which are indicative of the beginning of a stride and the relatively large negative peaks just before the zero crossings ES which are indicative of the end of a stride. Negative peaks can be detected by monitoring when the first derivative of the acceleration signal changes from negative to positive. Further, a smoothed version of the acceleration signal AS is constantly monitored. Finally two minima are logged, the overall minimum and a local minimum somewhere around the smaller negative peak BS at the moment the foot leaves the ground. When, at a certain negative peak, the value of the acceleration signal is below a certain limit, the peak is detected. This limit lies half way between the smoothed signal and the minimum. The peak finding algorithm is explained in more detail in conjunction with the flow chart of FIG. 7. The end of the stride can be recognized comparatively easily in the acceleration signal AS, because the bang of the foot's landing on the ground causes high acceleration peaks. The finding of the beginning of the stride, however, is more difficult. While the foot stands still on the ground, waiting to be launched in the air for the next stride, the acceleration signal AS is not zero as can be observed from the waveforms at moments BS in FIGS. 5 and 6. This is because of a few reasons: the slow recovery of the blow after the landing of the foot, the constant movement of the foot during the unwinding of the shoe in between the landing and take-off of the shoe from the ground, and the fading contribution of the gravitational acceleration due to the rapid angular movements of the foot.

The second main function of the algorithm is the single and double integration of the acceleration signal AS during the integration time IT between the beginning BS and the end ES of the stride. The single integration of the acceleration signal results in the speed v(t) of the travelling foot as a function of time, while the double integral of the acceleration signal gives the travelled distance x(t) of the foot as a function of time:

$$v(t)=\int a(t)dt,$$
$$x(t)=\int\int a(t)dt^2.$$

However, the acceleration signal AS is not only representative of the acceleration of the foot in the walking or running direction. Because of the constantly changing angle between the shoe and the ground, there is a complicated relationship between the acceleration in the walking or running direction and the acceleration sensed by the acceleration sensor 8. Further, because of this changing angle, also the gravitational acceleration results in a signal. Another contribution comes from the electronics. The signal voltage for zero acceleration is not always the same, or in other words, the offset of the acceleration signal is not known precisely due to deviations in the amplifier 10 and temperature deviations in the acceleration sensor 8 itself.

However, it is an important aspect of this invention that all these signal contributions are not needed when the condition is used that at the end ES of the stride the velocity of the shoe is zero, because it has landed on the ground. The single integration of the acceleration signal from the beginning BS of the stride when the foot starts moving to the end ES of the stride when the foot stops moving, i.e. the velocity v(t=ES) of the shoe at the end of the stride, however, is not equal to zero, due to the error in the acceleration signal caused by the above mentioned signal contributions. This error $a_{err}$ can be calculated by dividing the velocity v(t=ES) obtained at the end of the stride by the integration time IT:

$$a_{err}=v(ES)/IT.$$

Knowing the acceleration error $a_{err}$, the error $x_{err}$ in the stride length is:

$$x_{err}=\tfrac{1}{2}a_{err}(IT)^2.$$

The corrected stride length $x_{corr}$ is computed by subtracting the error $x_{err}$ from the stride length x(t=ES) found after double integration of the acceleration signal over the integration time IT:

$$x_{corr}=x(ES)-x_{err}.$$

The walking or running speed v is subsequently calculated by dividing the corrected stride length by the stride time ST:

$$v=\frac{x_{corr}}{ST}.$$

Because the human gait is a little bit irregular and also the determination of the speed may suffer from small deviations, the calculation of the speed gains in accuracy when the calculated speed is somewhat smoothed by averaging the calculated speed with the speed of the previous stride.

The system can be extended with a further acceleration sensor which is sensitive in a direction perpendicular to the forward direction of the runner for measuring stride or jump height in much the same way as the stride length is measured.

There is a reasonably exact relation between the walking or running speed and the energy expenditure of the runner or walker. If the mass of the runner is known, the total energy expenditure can be calculated from the speed data. The dependence of calories expended on speed is linear for walking and linear for running, although both with different slope and intersect. For this purpose the display unit 2 may be provided with buttons 22 for inputting and a memory 24 for storing the weight of the runner and with some kind of computing means 26 for combining the speed data received from the sensor unit 6 and the weight data and for computing the number of calories expended by the runner. However, the weight of the runner may also be measured automatically by means of a sensor mounted in the athletic shoe 4 in a fashion similar to personal weighing scales.

Separate systems which can be added to the system described above are, e.g., a heart rate monitor or an altimeter. The relation between heart rate and energy expenditure per unit time can be converted in a number which represents the fitness or condition of the user. A well-balanced exercise coached by the running aid can measure the energy expenditure as a function of heart rate, from which the fitness, expressed in $VO_{2,max}$ (ml/min/kg) of the user can be estimated.

The invention is not limited to measuring exercise performance of human beings. It should be appreciated that the invention can also be used with animals, for example horses and dogs. In particular with horses the additional acceleration sensor for sensing the jump height is a useful feature.

Figure 7:
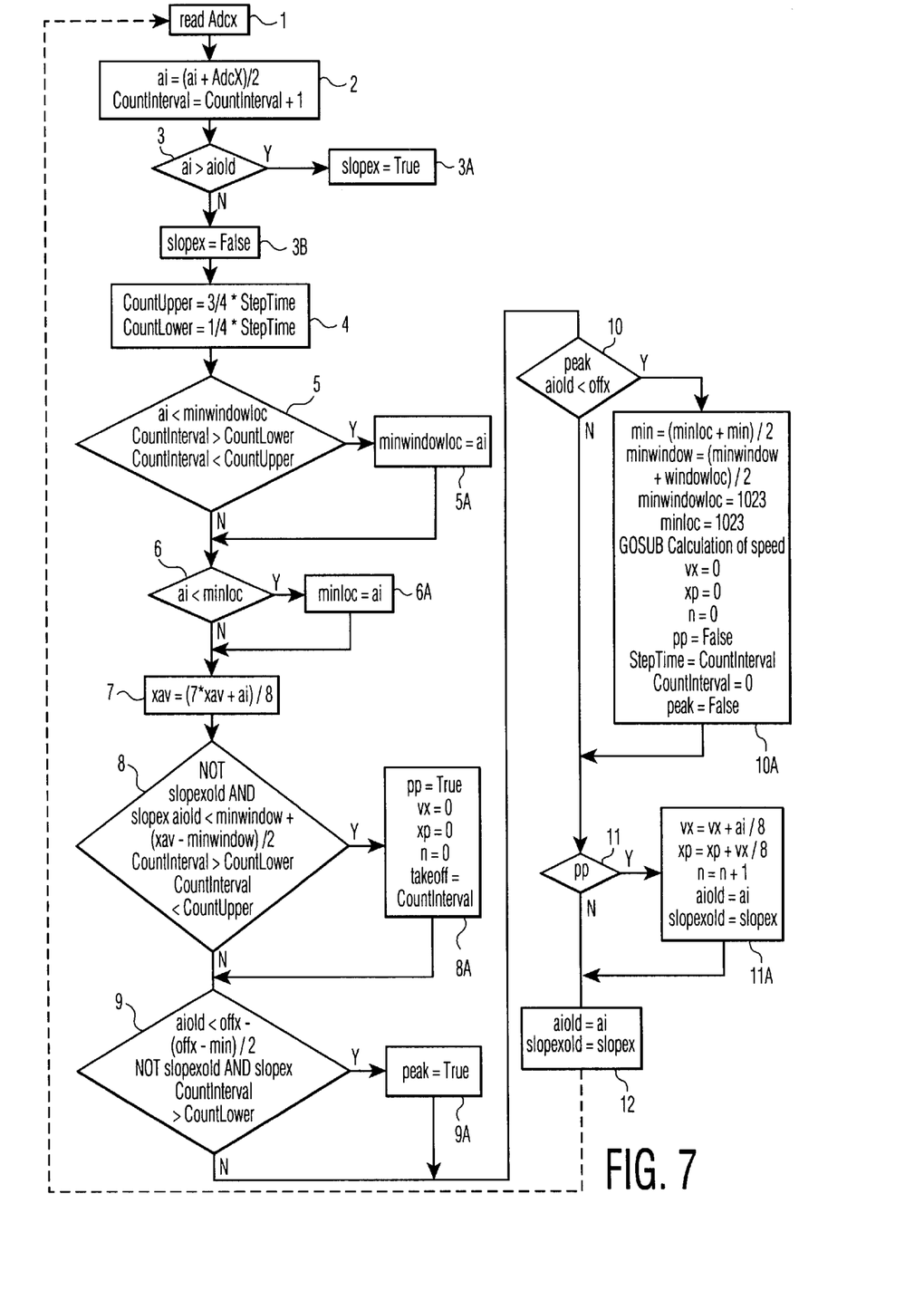
FIG. 7 shows a flow chart of the main program of an algorithm for computing the speed and distance traversed by the runner.
Figure 8:
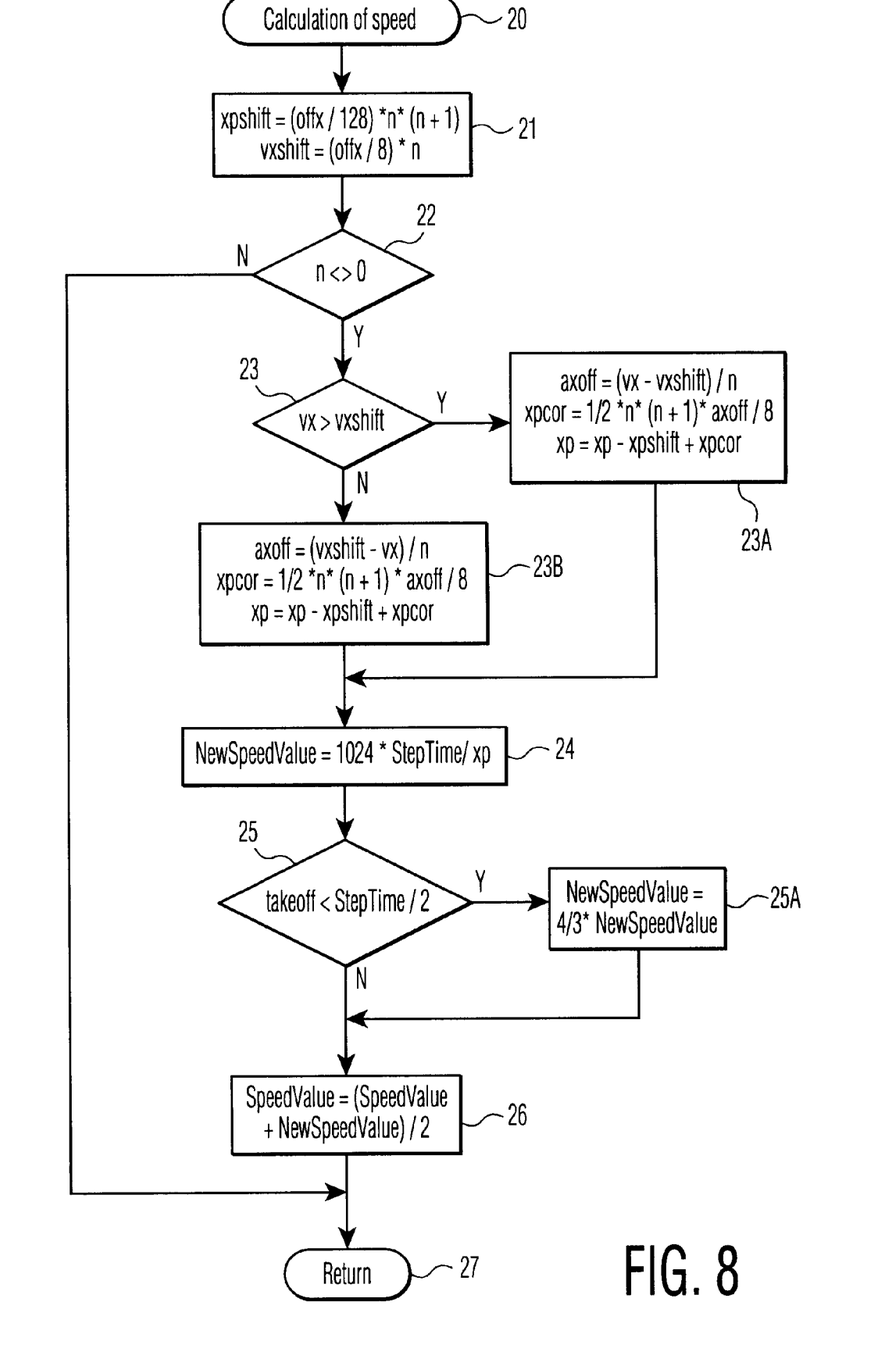
FIG. 8 shows a flow chart of a routine for calculating the speed of the runner.

The algorithm mentioned above is now presented in detail with reference to the flow charts shown in FIGS. 7 and 8. The blocks in FIG. 7 have the following inscriptions:

| | |
|---|---|
| 1 | read AdcX |
| 2 | ai = (ai + AdcX) / 2 |
| | CountInterval = CountInterval + 1 |
| 3 | ai > aiold |
| 3A | slopex = True |
| 3B | slopex = False |
| 4 | CountUpper = ¾ * StepTime |
| | CountLower = ¼ * StepTime |
| 5 | ai < minwindowloc |
| | CountInterval > CountLower |
| | CountInterval < CountUpper |
| 5A | minwindowloc = ai |
| 6 | ai < minloc |
| 6a | minloc = ai |
| 7 | xav = (7 * xav + ai) / 8 |
| 8 | NOT slopexold AND slopex |
| | aiold < minwindow + (xav − minwindow) / 2 |
| | CountInterval > CountLower |
| | CountInterval < CountUpper |
| 8A | pp = True |
| | vx = 0 |
| | xp = 0 |
| | n = 0 |
| | takeoff = CountInterval |
| 9 | aiold < offx − (offx − min) / 2 |
| | NOT slopexold AND slopex |
| | CountInterval > CountLower |
| 9A | peak = True |
| 10 | peak |
| | aiold < offx |
| | ai >= offx |
| 10A | min = (minloc + min) / 2 |
| | minwindow = (minwindow + windowloc) / 2 |
| | minwindowloc = 1023 |
| | minloc = 1023 |
| | GOSUB Calculation of speed |
| | vx = 0 |
| | xp = 0 |
| | n = 0 |
| | pp = False |
| | StepTime = CountInterval |
| | CountInterval = 0 |
| | peak = False |
| 11 | pp |
| 11A | vx = vx + ai / 8 |
| | xp = xp + vx / 8 |
| | n = n + 1 |
| 12 | aiold = ai |
| | slopexold = slopex |

The blocks in FIG. 8 have the following inscriptions:

| | |
|---|---|
| 20 | Calculation of speed |
| 21 | xpshift = (offx / 128) * n * (n + 1) |
| | vxshift = (offx / 8) * n |
| 22 | n <> 0 |
| 23 | vx > vxshift |
| 23A | axoff = (vx − vxshift) / n |
| | xpcor = ½ * n * (n + 1) * axoff / 8 |
| | xp = xp − xpshift − xpcor |
| 23B | axoff = (vxshift − vx) / n |
| | xpcor = ½ * n * (n + 1) * axoff / 8 |
| | xp = xp − xpshift + xpcor |
| 24 | NewSpeedValue = 1024 * StepTime / xp |
| 25 | takeoff < StepTime / 2 |
| 25A | NewSpeedValue = 4/3 * NewSpeedValue |
| 26 | SpeedValue = (SpeedValue + NewSpeedValue) / 2 |
| 27 | Return |

In the explanation of the flow charts the numbers to the left of the text refer to the blocks in the FIGS. 7 and 8.

FIG. 7 shows the flow chart of the main program of the algorithm.

1 The microprocessor 14 commands the analog to digital converter 12 to acquire a new value of the amplified signal of the acceleration sensor 8 and puts the obtained value in the variable AdcX

2 Subsequently, the value in variable AdcX is averaged with the value in variable ai. The so obtained smoothed value is stored in variable ai again. This variable thus represents the smoothed acceleration value at that point in time. Further, the counter CountInterval is increased by one. This counter counts the number of loops since the beginning of the stride, i.e. since the end of the previous stride.

3,3A,3B The value in variable ai is compared with the value of a variable aiold which stores the value of ai of the previous loop. If ai is larger than aiold, then the slope of the acceleration signal at that point in time is positive, and a bit slopex is set (Block 3A). If the value of ai is smaller than aiold, then the bit slopex is reset (Block 3B).

4 The value in the variable StepTime represents the stride time of the previous stride. On the basis of this value a window is set in the values of CountUpper, equal to StepTime times ¾, and CountLower, equal to StepTime times ¼.

5,5A If the counter CountInterval is in the window set by CountUpper and CountLower, then the value of ai is compared to the value in a variable mintwindowloc. If ai is smaller than minwindowloc, then minwindowloc is equalled to ai, so that this variable keeps track of the lowest value of ai within the time window.

6,6A If ai is smaller than minloc, then the value of the latter variable is equalled to ai, so that the variable minloc keeps track of the lowest value of ai within the whole stride.

7 A running average of the last eight values of the acceleration signal is calculated, resulting in a very smoothed version of the acceleration signal. The smoothed version, stored in xav is used as a tool to find the small negative peak (BS in FIGS. 5 and 6) at the beginning of the movement of the foot.

8,8A If the value of the counter CountInterval is in the window set by CountUpper and CountLower, and it is clear at this moment in time the acceleration signal is at the minimum of a negative peak, which is the case if slopexold is False and slopex is True, and if the value of this minimum is below half way minwindow and xav (conditions in Block 8), then (Block 8A) the small negative peak at the beginning of the movement of the foot has been found. This is the signal that the single and double integration of the acceleration signal can start, which is reflected in the setting of the bit pp and the initialization of the integration variables vx and xp and the integration counter n. Further the variable takeoff is equalled to the value of CountInterval, so that, when the StepTime is known at the end of the stride, it can be determined whether we are dealing with walking or running. The value of minwindow is a smoothed version of the local variable associated with this variable, i.e. minwindowloc. The smoothing takes place at the end of the stride and will show up later in the algorithm.

9,9A If the value of the counter CountInterval is larger than the value of CountLower and if it is clear at this moment in time the acceleration signal is at the minimum of a negative peak, since slopexold is False and slopex is True, and if the value of this minimum is below half way the zero acceleration line, stored in the variable offx, and min, which is the smoothed version of minloc, then we have found the large negative peak associated with the last large negative peak before the end of the stride (the peak left to zero crossing ES in FIGS. 5 and 6). The fact the peak is found is preserved by setting the bit Peak (Block 9A).

10,10A After the finding of the large negative peak, the value of the acceleration variable ai crosses the zero acceleration line offx. This point is found when Peak is True and ai is larger than offx and aiold is smaller than offx (Block 10). This moment is very important, because it is associated with the end of the stride. Many things have to be dealt with at the end of the stride (Block 10A):

a. The smoothed versions of the minimum detectors min and minwindow are calculated, and the local versions are reset to the maximum value of 1023;
 b. The bits Peak and pp are reset;
 c. The new value of the variable StepTime can now be equalled to the value in the counter CountInterval, and the counter CountInterval is reset to zero;
 d. The walking or running speed is calculated, which is done in a special subroutine Calculation of speed, explained below;
 e. After the calculation of the speed, the integration variables vx, xp, and n are reset to zero, although this is also done in Block 8A at the moment the small negative peak is found at the beginning of the movement of the foot.

11,11A If the bit pp is True (Block 11), the processor is allowed to integrate the acceleration ai in order to obtain the velocity vx and to integrate the velocity to obtain the distance xp (Block 11A). The values of ai and vx are divided by eight to prevent the variables vx and xp to become larger than 65535, the maximum value that can be stored in a 16-bit variable.

12 The last step in the algorithm is to shift the value in ai to aiold and the value of slopex in slopexold. After this the loop starts again at the beginning of the loop in Block 1. FIG. 8 shows the flow chart of the subroutine Calculation of speed.

21 The microprocessor can only perform calculations with positive integers. Of course, during the movement of the foot, both positive and negative accelerations occur. This implies that a certain mapping has to be done, so that both positive and negative values of the acceleration are mapped to the 10-bits regime allowed by the analog to digital converter. The logical mapping is to equalize zero acceleration to 512, which is half of 2 to the tenth power. Negative values of the acceleration are smaller than 512, while positive values of the acceleration are larger than 512. This also means that during the integration of the acceleration ai and the speed vx, the integration is not performed with respect to the real zero, but with respect to the offset of 512, stored in the variable offx. These extra areas have to be subtracted from the obtained values in vx and xp after the integration is ready. The value to be subtracted in the case of the single integration is stored in the variable vxshift and is equal to n times the offset offx, divided by eight, which was introduced during the integration (FIG. 7, Block 11A) to prevent overflow. The value to be subtracted in the case of the double integration is stored in the variable xpshift and is equal to ½ times n times (n+1) times the offset offx divided by the square of eight, i.e. 64.

22 If the integration counter n is not zero, which means that integration actually has taken place, the calculation of the speed can start, otherwise the calculation is skipped.

23,23A,23B The value of vx minus the value of vxshift in a perfect system without gravity should be zero, because the foot at the end of the stride stands still on the ground. However, in practice, this is not the case. The value in vx is therefore used to calculate a correction of the stride length xp. If vx is larger than vxshift, the subtraction vx−vxshift can take place without any danger of obtaining a negative number. In that case the virtual offset in the acceleration axoff is calculated by dividing this difference by n (Block 23A). If the value of vx is smaller than vxshift, the subtraction would result in a negative number. Therefore a separate routine (Block 23B) calculates the offset in the acceleration by subtracting vx from vxshift and dividing it by n. Subsequently the correction of xp is calculated by multiplying (½)*n(n+1) and axoff/8 (Blocks 23A and 23B).

24 The walking or running speed can now be calculated, since the stride time StepTime and stride length xp are both known. However, the speed is not expressed in km/h or mi/h, but in the time between two subsequent signals for the cyclocomputer, assuming a known virtual wheel circumference. This is calculated by dividing StepTime by xp and multiplying the result with a certain calibration factor (1024 in this case). The value is stored in the variable NewSpeedValue.

25,25A This part of the program is a refining correction. From tests it appears that the running speed is estimated approximately 30% too high. Since the algorithm can distinguish between walking and running (Block 25), it can easily correct this error by multiplying the NewSpeedValue by 4/3 (Block 25A). It appeared from observations that the time the shoe or foot is on the ground is larger than 50% of the stride time while walking and smaller than 50% of the stride time while running.

26 Finally, a smoothing over two, or more, strides is made to reduce the variability of the speed data. The actual speed is stored in the variable SpeedValue.

27 The subroutine is ready and control is returned to the main program of the algorithm.

Obviously, many modifications and variations of the above preferred embodiment of the invention will become apparent from this disclosure. It should be realized that the invention is not limited to the particular embodiment disclosed, but its scope is intended to be governed only by the scope of the appended claims.

What is claimed is:

1. A system for measuring performance during an exercise activity comprising:

an acceleration sensor for measuring acceleration in a moving direction of a foot of an exerciser and for providing an acceleration signal in response to said acceleration;

signal processing means comprising:

means for analyzing a waveform of the acceleration signal and for determining from the analyzing a beginning and an end of movement of the foot during a stride made by the foot of the exerciser;

means for single integrating and for double integrating the acceleration signal between said beginning and said end of movement in order to compute the speed of the foot as a function of time during the stride and the distance traversed by the foot as a function of time during the stride, respectively;

means for computing an acceleration error by equalizing the acceleration error with the speed at the end of the movement of the foot divided by the time lapsed between the end and the beginning of the stride;

means for computing a distance error by double integrating the acceleration error over said time lapsed between the end and the beginning of the movement of the foot;

means for computing a corrected distance by subtracting the distance error from the distance traversed during the stride.

2. A system as claimed in claim 1, wherein the signal processing means further comprises:

means for computing a speed of the exerciser by dividing the corrected distance by a time lapsed between successive strides.

3. A system as claimed in claim 1, wherein the moving direction is substantially parallel to a line between the heel and the toes of the foot of the exerciser.

4. A system as claimed in claim 1, wherein the moving direction is substantially perpendicular to a line between the heel and the toes of the foot of the exerciser.

5. A system as claimed in claim 1, further comprising:

means for inputting personal data of the exerciser to the signal processing means.

6. A system as claimed in claim 5, wherein the data comprises a mass of the exerciser, the signal processing means being operative to compute a number of calories expended by the exerciser from the speed and the mass.

7. A system as claimed in claim 6, wherein the data comprises a heart rate of the exerciser, the signal processing means being operative to compute a fitness indication from the heart rate and the calories expended per unit of time.

8. A system as claimed in claim 1, further comprising:

display means coupled to the signal processing means for displaying exercise parameters.

9. A system as claimed in claim 8, wherein the exercise parameters comprise at least one of: current speed, average speed, maximum speed, stride length, distance traversed, elapsed time, number of calories expended, and fitness indication.

10. A system as claimed in claim 8, further comprising a wireless transmitter and receiver for coupling the signal processing means to the display means.

11. An athletic shoe comprising an acceleration sensor for use in the system as claimed in claim 1, the acceleration sensor being mounted for measuring acceleration in a moving direction of the athletic shoe for providing an acceleration signal in response to said acceleration.

12. An athletic shoe as claimed in claim 11, wherein the moving direction is substantially parallel to a line between the heel and the nose the shoe.

13. An athletic shoe as claimed in claim 11, wherein the moving direction is substantially perpendicular to a line between the heel and the nose the shoe.

14. An athletic shoe as claimed in claim 11, further comprising a transmitter for transmitting data related to or derived from the acceleration signal.

15. An athletic shoe as claimed in claim 11, further comprising signal processing means, the signal processing means comprising:

means for analyzing a waveform of the acceleration signal and for determining from the analyzing a beginning and an end of movement of the foot during a stride made by the foot of the exerciser;

means for single integrating and for double integrating the acceleration signal between said beginning and said end of movement in order to compute the speed of the foot as a function of time during the stride and the distance traversed by the foot as a function of time during the stride, respectively;

means for computing an acceleration error by equalizing the acceleration error with the speed at the end of the movement of the foot divided by the time lapsed between the end and the beginning of the stride;

means for computing a distance error by integrating the acceleration error over said time lapsed between the end and the beginning of the movement of the foot;

means for computing a corrected distance by subtracting the distance error from the distance traversed during the stride.

16. An athletic shoe as claimed in claim 11, wherein the signal processing means further comprises:

means for computing a speed of the exerciser by dividing the corrected distance by a time lapsed between successive strides.

17. A method of measuring performance during an exercise activity comprising the steps of:

measuring, by means of an acceleration sensor, acceleration in a moving direction of a foot of an exerciser and providing an acceleration signal in response to said acceleration;

processing the acceleration signal, the processing comprising the steps of:

analyzing a waveform of the acceleration signal and determining from the analyzing a beginning and an end of movement of the foot during a stride made by the foot of the exerciser;

single integrating and double integrating the acceleration signal between said beginning and said end of movement in order to compute the speed of the foot as a function of time during the stride and the distance traversed by the foot as a function of time during the stride, respectively;

computing an acceleration error by equalizing the acceleration error with the speed at the end of the movement of the foot divided by the time lapsed between the end and the beginning of the movement of the foot;

computing a distance error by double integrating the acceleration error over said time lapsed between the end and the beginning of the stride;

computing a corrected distance by subtracting the distance error from the distance traversed during the stride.

18. A method as claimed in claim 17, wherein the signal processing further comprises the step of:
   computing a speed of the exerciser by dividing the corrected distance by a time lapsed between successive strides.

19. A method as claimed in claim 17, wherein the moving direction is selected substantially parallel to a line between the heel and the toes of the foot of the exerciser.

20. A system as claimed in claim 17, wherein the moving direction is selected substantially perpendicular to a line between the heel and the toes of the foot of the exerciser.

* * * * *